United States Patent [19]

Waltz

[11] Patent Number: 5,119,587
[45] Date of Patent: Jun. 9, 1992

[54] METHOD AND APPARATUS FOR LANDSCAPE EDGING

[76] Inventor: Ross E. Waltz, 1750 Collins Cir., Reno, Nev. 89506

[21] Appl. No.: 459,471

[22] Filed: Jan. 2, 1990

[51] Int. Cl.$^5$ ............................................. A01G 13/00
[52] U.S. Cl. .......................................... 47/33; 52/102
[58] Field of Search .............. 52/102, 606, 608, 593, 52/748, 72, DIG. 2; 47/33; 404/40, 41

[56] References Cited

U.S. PATENT DOCUMENTS

| | | | |
|---|---|---|---|
| 449,739 | 4/1891 | Hazelton | 404/41 |
| 1,527,684 | 2/1925 | Hull | 52/574 |
| 1,988,856 | 1/1935 | Passino | 52/585 |
| 2,605,681 | 8/1952 | Trief | 404/41 |
| 2,888,779 | 6/1959 | Hostetter | 52/102 |
| 3,314,193 | 6/1965 | Chancellor | 47/33 |
| 3,874,132 | 4/1975 | Mendelow et al. | 52/71 |
| 4,148,163 | 4/1979 | Chenin et al. | 52/71 |
| 4,982,535 | 1/1991 | Pickett | 52/71 |
| 5,003,746 | 4/1991 | Wilston | 52/608 |

Primary Examiner—David A. Scherbel
Assistant Examiner—Michele A. VanPatten
Attorney, Agent, or Firm—Herbert C. Schulze

[57] ABSTRACT

A method and apparatus for forming irregular, and regular, edgings for landscaping, and the like, exemplified by the use of specially constructed blocks, or bricks, having ends with curvatures such that irregular designs may be utilized and irregular or unusual terraine may be accommodated without the necessity of having gaps or spaces between various elements in creating an irregular design; One portion of each block will be curved in a convex manner. Another portion will be curved in a concave manner. The curved ends may be in one plane, or in more than one plane with overlapping and underlapping ends being curved appropriately. Appropriate scoring or marking may be provided to break blocks intermediate therein to form a square end to a particular edging design if desired; alternatively pegs are provided to match holes in portions of the blocks; or, holes are provided all the way through certain of the matching block elements in order to drive stakes through and into the ground if desired.

2 Claims, 5 Drawing Sheets

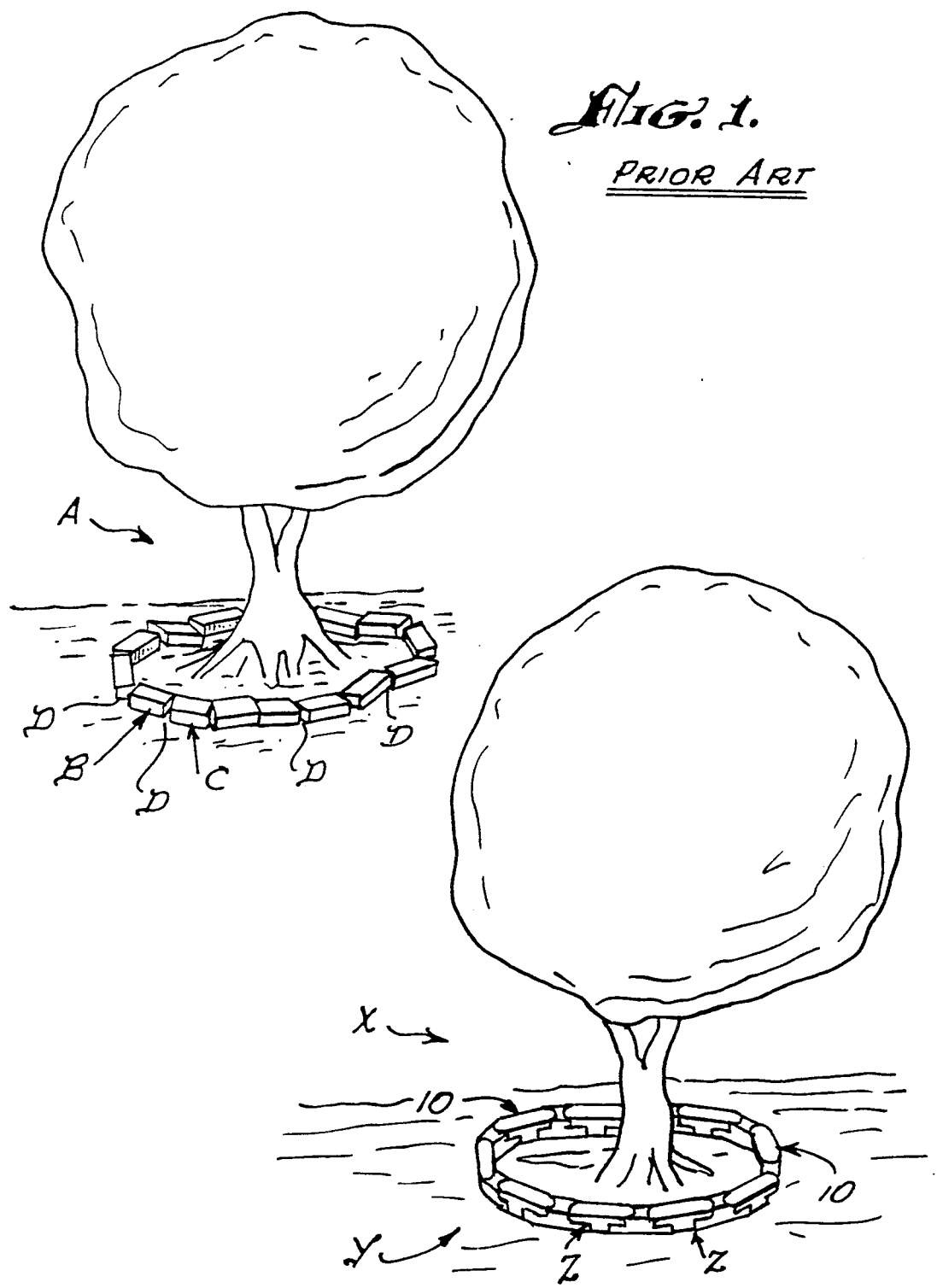

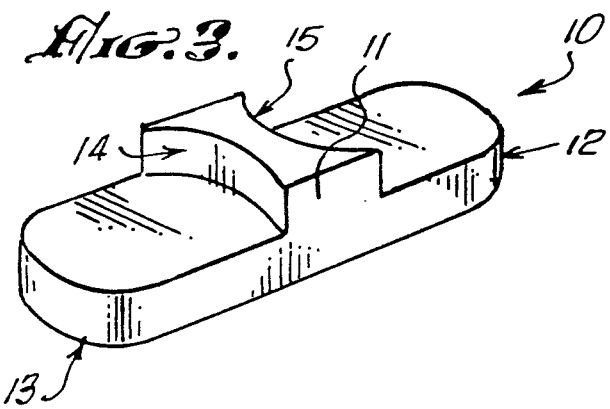
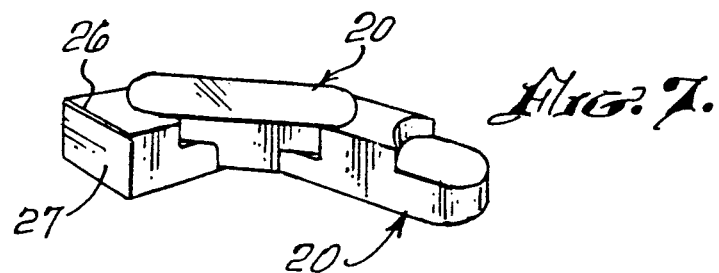
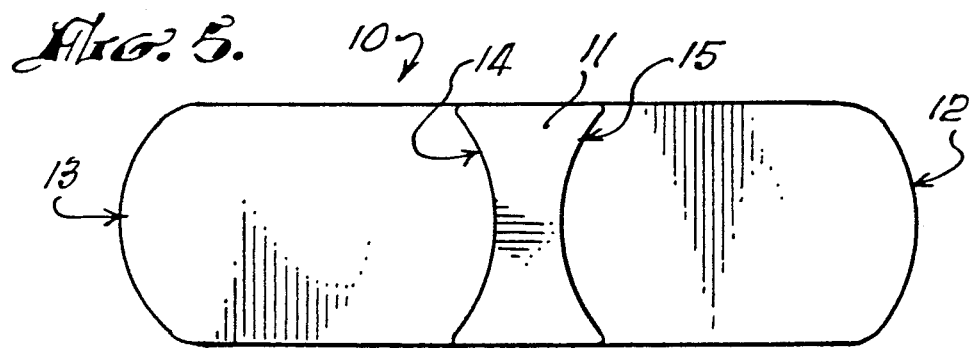
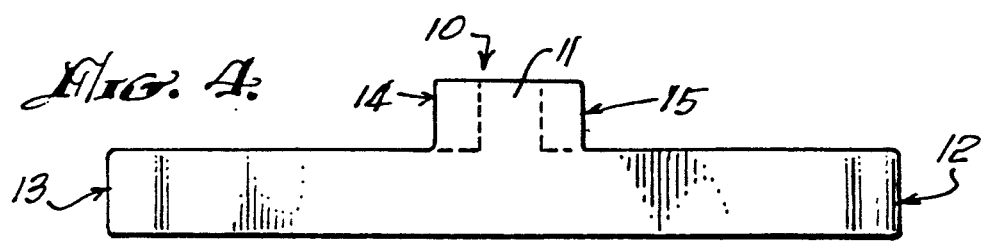
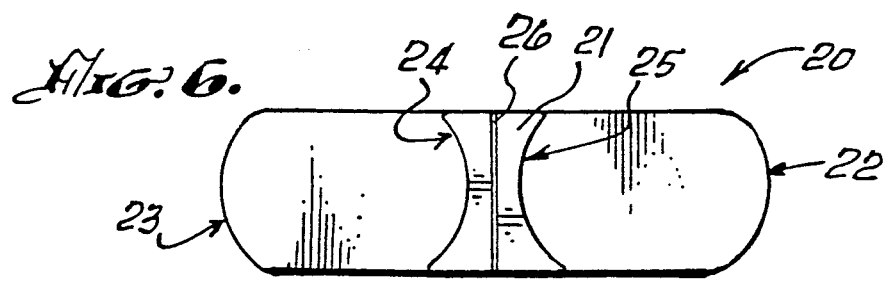

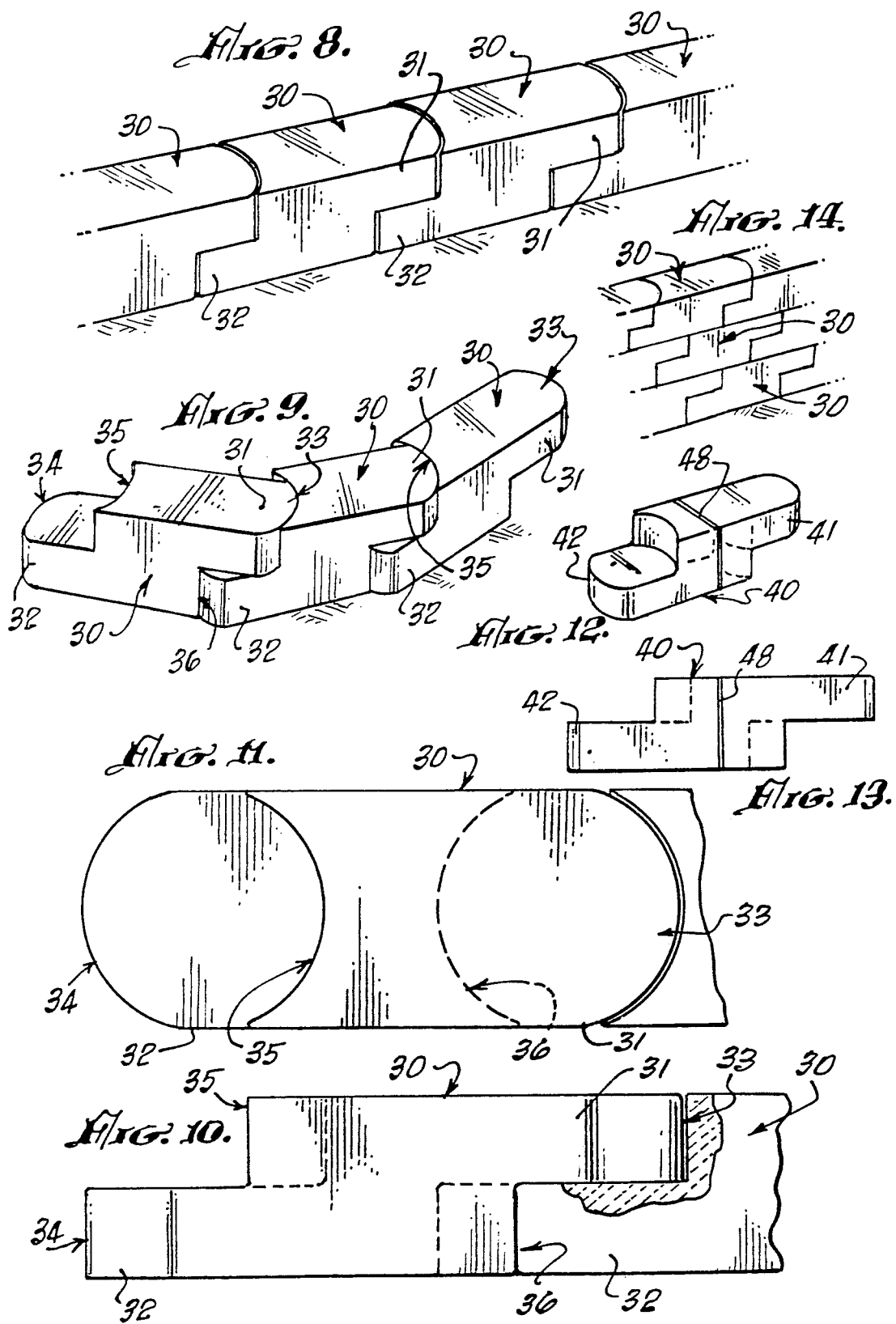

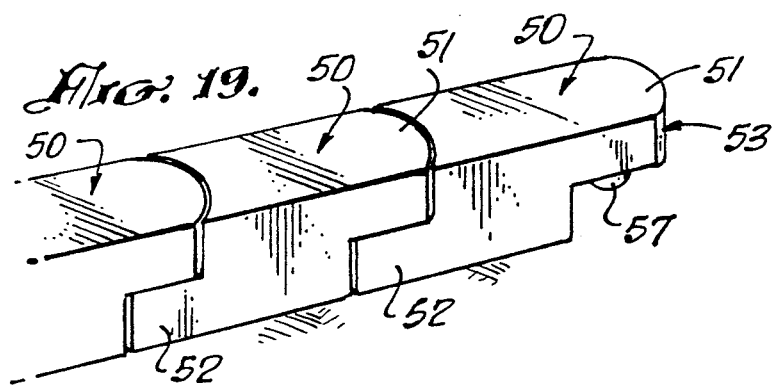
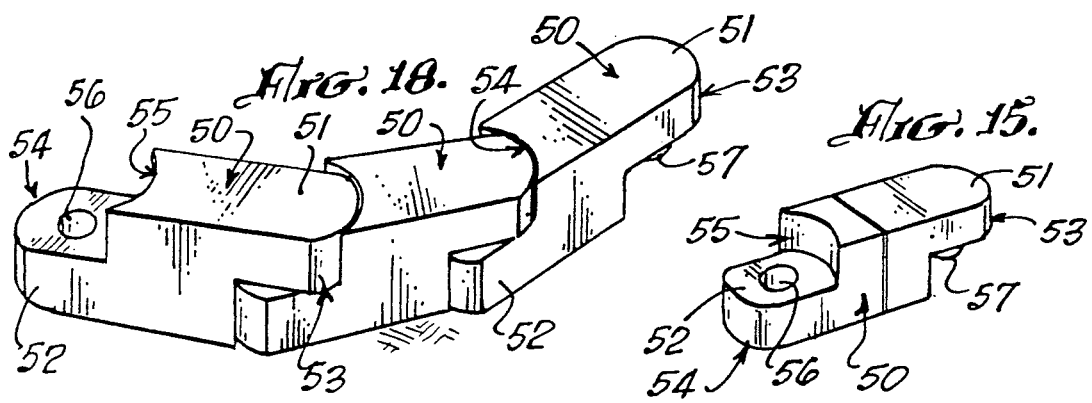
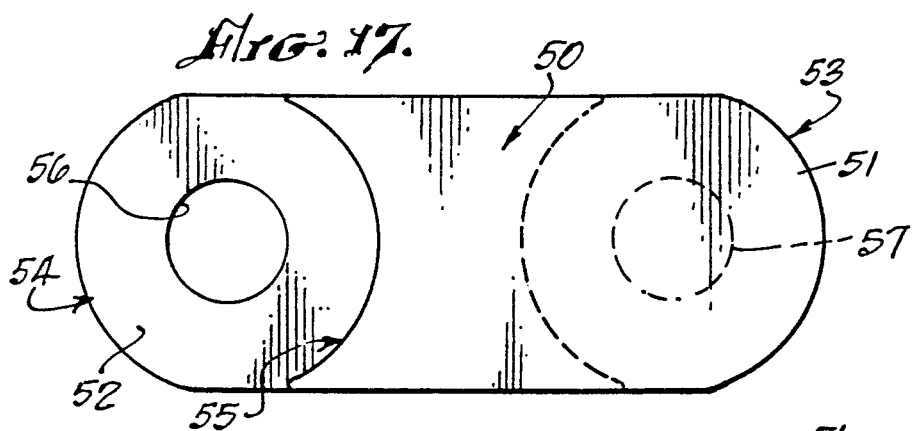
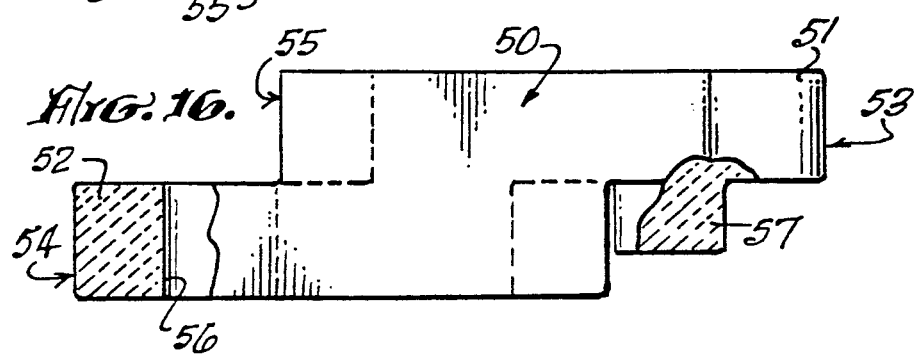

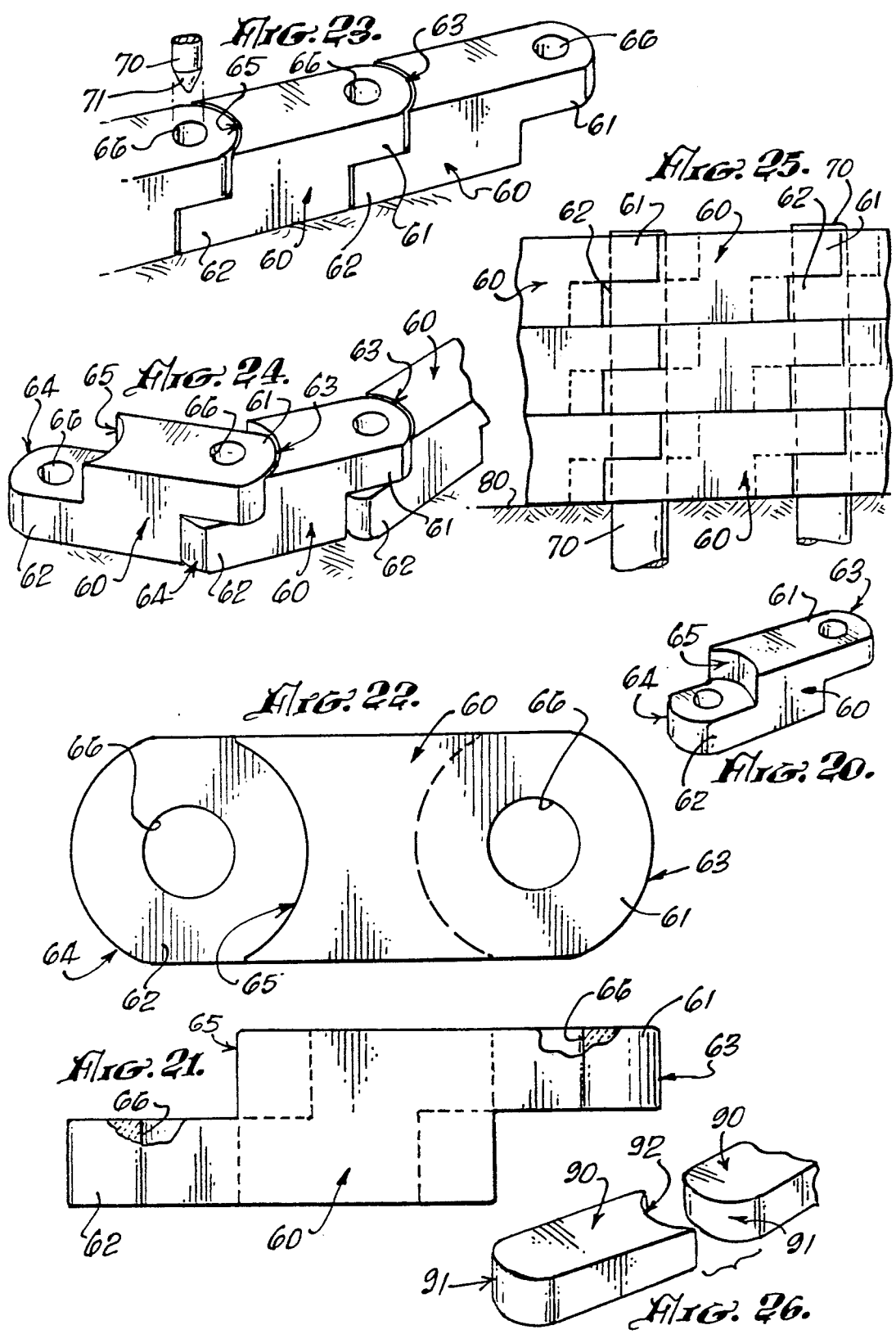

METHOD AND APPARATUS FOR LANDSCAPE EDGING

CROSS REFERENCE TO RELATED PATENT APPLICATIONS

There are no patent applications filed by me related to the within application except for my application for the design of a landscape edging block being filed concurrently herewith.

BACKGROUND OF THE INVENTION

1. FIELD OF THE INVENTION

This invention is in the general field of edging for lawns, flower beds, around trees and bushes, for flower boxes adjacent buildings and the like, and similar landscaping activities. The invention is more particularly directed to the use of specially formed blocks having ends with curvatures suitable to engage and hold one another in position with, or without, the use of mortars and the like.

2. DESCRIPTION OF THE PRIOR ART

There is no prior art known to me for accomplishing the ends desired as hereinafter described in this application with the exception of customary rectangular bricks and blocks which may be placed end to end, approaching another at one corner and leaving a gap between them. In order to create a satisfactory edging from such blocks; the gap must be filled with mortar, concrete, or the like. My invention is completely distinct from the prior art using bricks and the like as described in that the blocks utilized in my invention have curved matching elements which hold them in position firmly. My blocks may have overlapping and underlapping ends to further strengthen and hold the blocks in position. In alternative form my blocks employ a new and distinct element of the use of stakes or the like through holes in the blocks to hold them in position under severely adverse conditions. There is no art known to me encompassing these innovations.

SUMMARY OF THE INVENTION

In landscaping, and the like, it is frequently desirable, or necessary, to provide an edging around certain landscaping objects such as natural terrain obstacles, bushes, trees, and the like, or to create irregular designs for aesthetic purposes.

Most commonly, irregular edgings are made of concrete blocks, bricks, and the like. A common difficulty is that blocks, bricks, and the like are generally rectangular in shape. When an irregular pattern (not in a straight line) is desired, or necessary, such blocks or bricks must be placed in such manner that edges touch or approximately touch on one side with a gap between the edges on another side. This creates the necessity of filling with considerable grout or with angularly cut pieces of blocks or bricks, still requiring grout or the like to hold the units in place. The result is usually a loss of time and a loss of the visual attractiveness of the edging. Additionally such blocks easily slide apart, and do not remain as a proper edging.

I have studied this problem in detail. I have experimented with various items to attempt to cure the problem. I have now conceived and developed specially constructed blocks and bricks having ends with convex and concave curvatures so that such blocks or bricks may fit together and will be held by the curved elements so that no grout is necessary in most instances. Slipping is almost impossible with such blocks.

By the use of my blocks, or bricks, an unskilled person can create a perfect edging in almost any shape.

In addition to providing a system for creating irregular, as well as regular, shapes I have provided alternative elements making it possible to stack the blocks or bricks successfully upon each other without the necessity of grout or other adhesive material. Further I have provided means to create square ends, as desired, by appropriately scoring or marking certain of the bricks or blocks so they may be broken cleanly at the desired point of termination.

An object of this invention is to provide a method by which a skilled, or unskilled person, may create perfect edging to conform to the requirements of terrain or any aesthetic or other requirements as to its lineal configuration.

Another object of this invention is to provide an edging method and apparatus as has been described wherein no mortar or other adhesive material is required to maintain such edging in proper alignment.

Another object of this invention is to provide an edging method and apparatus wherein the edging element can be stacked with out mortar or the like and without the danger of collapse.

The foregoing and other objects and advantages of this invention will become apparent to those skilled in the art upon reading the description of a preferred embodiment which follows in conjunction with a review of the appended drawings.

BRIEF DESCRIPTION OF THE DRAWINGS

FIG. 1 landscape edging according to the prior art, wherein curved edging must be achieved;

FIG. 2 illustrates the same requirements as FIG. 1 using the method and apparatus of this invention;

FIG. 3 is a perspective of one embodiment of a block to utilize the method and apparatus of this invention;

FIG. 4 is a side elevation of the embodiment of FIG. 3;

FIG. 5 is a top elevation of the embodiment of FIG. 3;

FIG. 6 is a top elevation of an alternate embodiment of the block of FIG. 5 in reduced size;

FIG. 7 is a perspective of 3 blocks of the embodiment of FIGS. 3 through 6;

FIG. 8 is a perspective of an edging section utilizing another embodiment of a block to practice the method of this invention;

FIG. 9 illustrates a short curved segment of a number of the blocks of the embodiment of FIG. 8;

FIG. 10 is a partially broken away side elevation of two blocks of the embodiment of FIG. 8;

FIG. 11 is an reduced scale top elevation on FIG. 10;

FIG. 12 is a perspective of a block of the embodiment of FIG. 8, being scored for breaking;

FIG. 13 is a side elevation of the embodiment of FIG. 11;

FIG. 14 is a perspective of a number of blocks of the embodiment of FIG. 8 stacked to form an elevated edging;

FIG. 15 is a perspective of another alternate embodiment of the block of this invention;

FIG. 16 is an enlarged side elevation of the block of FIG. 15;

FIG. 17 is a top elevation of the block of FIG. 16;

FIG. 18 is a perspective of a number of blocks of the embodiment of FIG. 15 being placed in a curved configuration.

FIG. 19 is a perspective of a number of blocks of the embodiment of FIG. 15 being placed in a straight lineal configuration;

FIG. 20 is a perspective of another embodiment of a block to the method of this invention;

FIG. 21 is an enlarged side elevation, partially broken away, of a block of the embodiment of FIG. 20;

FIG. 22 is a top elevation of a block of the embodiment of FIG. 20;

FIG. 23 is a perspective of a number of blocks of the embodiment of FIG. 20 showing a stake about to be driven through to hold the blocks in place;

FIG. 24 is a perspective of a number of blocks of the embodiment of FIG. 20 showing a curved configuration;

FIG. 25 is a side elevation of a number of blocks of the configuration of the embodiment of FIG. 20 being stacked so as to create an elevated edging; and FIG. 26 is a perspective of one block and a portion of a matching block of a simplified design of an embodiment of a block to practice the method of this invention.

DESCRIPTION OF A PREFERRED EMBODIMENT

FIG. 1 shows a tree generally A with an edging around it composed of customary blocks or bricks B and C wherein gaps D are formed in order to create a curved edging around the tree.

As will be understood by those skilled in the art these blocks will slide apart from each other as illustrated in FIG. 1 creating an unsightly situation, even if mortar is placed between the blocks at the gap D.

FIG. 2 shows the same general configuration wherein a tree generally X has a neat edging generally Y formed by plurality of blocks 10 of this invention, each having curved ends as at Z to form neat circular edging around the tree.

FIG. 3 shows one preferred embodiment of the block 10 wherein it is noted that the block 10 has an elevated center portion 11 having two curved areas 14 and 15 with the lower portion having curved ends 12 and 13. These same elements are illustrated in FIGS. 4 and 5.

FIG. 6 shows an alternate embodiment generally 20 very similar to the embodiment of FIGS. 3, 4 and 5 but with scoring at the center at 26. The curved ends 22, 23, 24 and 25 serve the same function as the curved ends 12, 13, 14 and 15 in FIG. 3. The advantage of this latter bricks is shown at FIG. 7 (wherein the scored lines do not show except on the block at the left side of the illustration of FIG. 7). At this point it is noted that a square end 27 has been formed by breaking along the scoring 26. There will also be scoring at the mid point of the other two blocks, which is not shown in this illustration so as to not confuse the illustration. It is to be understood that this illustration could also embody blocks 10. The left block would have to be cut in order to achieve the flat end which would occur at the end of a series of blocks forming an edging.

FIGS. 8, 9, 10 and 11 may be viewed together. These figures illustrate another form of a block to practice the method of this invention wherein the block 30 has an overlapping end 31 and an underlapping end 32, each of which is curved so as to fit the curved upper portion 35 and under portion 36 of the blocks 30. It will be clear from this series of drawings how these elements fit together in such manner that they form an edging, the elements of which cannot readily move from the alignment in which they are placed, due to their interlocking curved ends.

FIGS. 12 and 13 show a block 40 very similar to block 30 except block 40, having overlapping ends 41 and underlapping ends 42 is scored at 48 so as to be capable of being broken away to create a flat end at the end of any particular edging.

In FIG. 14 a number of blocks 30 are shown stacked on top of one another to create a higher edging.

FIGS. 15, 16, 17, 18 and 19 illustrate still another embodiment of this invention having some distinct advantages as to alignment and the ability of the blocks to stay together. The view of FIG. 15 shows the basic block 5 having an overlapping end 51 and an underlapping end 52 with appropriately curved ends 53 and 54 and curved matching elements at 55 and on the underside, not numbered, to fit end 54. A scoring mark for breaking has previously been described with other embodiments and may be used on some of the blocks.

The hole 56 in the underlapping portion of each block and the peg 57 on the overlapping portion of each block fits in order to hold the blocks in firm relationship to one another in the desired position.

FIGS. 20, 21, 22, 23, 24 and 25 should be viewed together as they represent still another embodiment of a block which is particularly desirable for certain applications utilizing the method o this invention. Each basic block 60 is shown to have an overlapping end 61 and an underlapping end 62 with curved areas at 63, 64 and 65 as indicated. In this case each block is provided with a hole extending through the underlapping and overlapping portions at 66 so that a stake 70 generally having pointed end 71 may be driven through the two aligning holes 66 as shown in FIG. 23 or through a multiplicity of such blocks if stacked so as to create a higher edging as shown in FIG. 25. The stakes 70 will be driven into the ground and allowed to become flush with the top block whether it be one series of blocks or a number of series of blocks as shown in FIG. 25. In this embodiment the blocks will be held very securely against any possible movement by reason of being bumped by garden equipment or the like or otherwise.

A final and the most simple embodiment of this invention is shown at FIG. 26 wherein blocks 90 have curved ends 91 and 92 which will match together. A number of blocks placed in alignment with their curved ends fitting together will be quite secure against normal disturbance under the usual conditions which will be encountered.

While the embodiments of this invention shown and described are fully capable of achieving the objects and advantages desired, it will be apparent to those skilled in the art that these embodiments have been shown for purposes of illustration and not for purposes of limitation and are intended only for purposes of illustration and not for limitation.

I claim:

1. The method of waltresp forming a landscaping edging wall comprising: forming a series of blocks, each of which has a top, a bottom, a front side, a back side, a first end and a second end, wherein the first end is recessed over half the thickness from the bottom to the top and the recessed portion terminates in concave shape and wherein the non-recessed portion of the first and terminates in a convex shape inverse to said concave shape, and wherein the second end is recessed over half the thickness from the top to the bottom and the recessed portion terminates in a concave shape identical to the concave shape on the first end and wherein the non-recesses portion terminates in convex shape identical to the convex shape on the first end; forming a hole in each of the non-recessed portions of the first and second ends; placing a first one of said blocks on a ground surface, placing a second one of said blocks on the ground surface with its first end mating with the second end of the first block and the holes in the two non-recessed portions in alignment; and driving a stake through said holes and into the ground.

2. A block for forming edging in landscaping wherein said block has a central portion having concave termination areas and having two extending portions having a convex configuration wherein a like block may have its convex and concave portions fit within the convex and concave portions of the adjoining block and wherein a hole is provided through each of the two extending portions such that the holes will line up with one another when two blocks as so described are fit together with two extending portions aligned one on top of the other.

* * * * *